United States Patent [19]
Friemoth et al.

[11] Patent Number: 5,116,018
[45] Date of Patent: May 26, 1992

[54] LOCKOUT MODULES

[75] Inventors: Dale J. Friemoth, Loveland, Ohio; Steven A. Hacker, Erlanger, Ky.; Jeff M. Loeb, Cincinnati, Ohio

[73] Assignee: Automax, Inc., Cincinnati, Ohio

[21] Appl. No.: 684,656

[22] Filed: Apr. 12, 1991

[51] Int. Cl.⁵ .............................................. F16K 31/44
[52] U.S. Cl. ..................................... 251/90; 251/110
[58] Field of Search ........................... 251/89, 90, 110; 74/813 L

[56] References Cited

U.S. PATENT DOCUMENTS

| | | | |
|---|---|---|---|
| 2,584,937 | 2/1952 | Struckenholt | 251/110 |
| 2,853,094 | 9/1958 | Wexler | 251/90 X |
| 2,912,218 | 11/1959 | Stillwagon | 251/110 X |
| 3,448,762 | 6/1969 | Schmitt . | |
| 3,687,415 | 8/1972 | Turkot . | |
| 4,135,838 | 1/1979 | Vandenberg . | |
| 4,203,572 | 5/1980 | Coffman . | |
| 4,208,033 | 6/1980 | Kesterman . | |
| 4,231,389 | 11/1980 | Still et al. . | |
| 4,313,595 | 2/1982 | Markley et al. . | |
| 4,444,220 | 4/1984 | Seger | 251/90 X |
| 4,629,157 | 12/1986 | Tsuchiya et al. . | |
| 4,633,897 | 1/1987 | Effenberger . | |
| 4,647,003 | 3/1987 | Hilpert et al. . | |
| 4,719,939 | 1/1988 | Killian . | |
| 4,723,569 | 2/1988 | Ellis . | |
| 4,887,634 | 12/1989 | Killian . | |
| 4,936,336 | 6/1990 | McCauley et al. . | |

Primary Examiner—Alan Cohan
Attorney, Agent, or Firm—Wood, Herron & Evans

[57] ABSTRACT

A lockout module is adapted to be mounted between an actuator-to-valve mounting kit and a valve actuator, and is operable to lock the valve in either an opened position or a closed position. In a preferred embodiment, the lockout module comprises a housing, a spindle, a lockout pin, and a lockout tab. The lockout pin is inserted in the housing for selective engagement and blocking of the spindle or for releasing the spindle. A padlock is locked through a lockout wheel on the lockout pin and the lockout tab, the lockout tab engaging a groove within an appendage of the housing to prevent pin and valve movement. In an alternative embodiment, the lockout module comprises a housing, a spindle, a pair of lockout pins, and a pair of pull pins. The lockout pins are inserted in the housing for selective engagement and blocking of the spindle or for releasing the spindle. The pull pins are inserted through the housing and the lockout pins, and padlocks are locked through bores in the ends of the pull pins to secure them, the lockout pins, the spindle and hence the valve.

25 Claims, 4 Drawing Sheets

LOCKOUT MODULES

This invention relates generally to valve locking devices, and more particularly to lockout modules for universal application to various valve and valve actuator configurations.

Many types of valves are used in industry, such as in chemical processing plants and the like. Actuators are used to operate these valves between open and closed positions. In order to attach an actuator to a valve, an actuator-to-valve mounting kit is typically used as an interface therebetween. One end of the actuator-to-valve mounting kit is adapted to be connected to the valve, and the other end of the actuator-to-valve mounting kit is adapted to be connected to the actuator.

A valve manufacturing company typically manufactures a large number of valves, of various designs and sizes. An actuator manufacturing company will manufacture a fewer number of actuators, however, since each company supplies a model for use with a number of different valves. These companies also supply various actuator-to-valve mounting kits.

Governmental regulations, such as OSHA regulations, now require many valves to have lockout devices for the purpose of positively locking the valves in a single position for safety, security or other reasons. Therefore, new valves, actuator mounting kits, and actuator assemblies must include some sort of lockout device. And, existing assemblies must be retrofitted with some sort of lockout device to comply with such regulations.

One solution to the lockout problem is to supply mounting kits equipped with lockout devices, both for inclusion in new assemblies, and for retrofitting existing assemblies. However, this solution is disadvantageous in many respects.

With respect to new assemblies, it would be necessary to fabricate each mounting kit with a specific type of lockout device particularly suited to the valve and actuator to be associated with the mounting kit. This results in a large number of specific varieties of mounting kits being required, with each variety being of relatively low volume and thus expensive to manufacture. Furthermore, mounting kits which are presently in stock but have no lockout device therein are rendered useless; companies would simply have to write-off this backlog.

With respect to existing assemblies, it would be necessary to replace the existing mounting kit having no lockout device with one of the abovementioned low volume, specifically manufactured mounting kits including the lockout feature. But, this effectively results in scrapping the replaced mounting kits.

It is therefore desirable to provide a universal lockout apparatus, which would be relatively inexpensive to manufacture, preferably in volume, and would not render useless existing mounting kits, whether in stock or in the field.

It has therefore been one objective of the present invention to provide a lockout device which can readily be retrofitted into an existing valve and actuator assembly.

It has been another objective of the present invention to provide a universal lockout apparatus which accordingly can be manufactured in relatively high volume, thereby significantly decreasing the cost and expense of manufacturing the lockout apparatus.

It has been yet another objective of the present invention to provide a lockout means which can be used with existing mounting kits and in original manufacture assemblies.

To these ends, a preferred embodiment of the present invention contemplates a lockout module which interfaces actuator-to-valve mounting kits to actuators used with associated valves, and is operable to lock the valve in either open or closed positions.

The lockout module of the present invention comprises, generally, a housing, a spindle, and spindle blocking means. The spindle is disposed within the housing and has one universal end adapted to be connected to an actuator-to-valve mounting kit and another universal end adapted to be connected to the actuator. Operation of the actuator turns the module spindle and mounting kit spindle to operate the valve. The spindle blocking means is operable to selectively block the module spindle and hence the valve in one or the other of the positions.

In a preferred embodiment, the spindle blocking means includes a lockout pin disposed in a lockout pin bore in the housing, and a lockout tab engagable between the housing and the lockout pin. When the lockout pin is threaded into the lockout pin bore the lockout pin blocks rotation of the module spindle by engaging a recess in the spindle. The lockout tab is positioned within a groove in an appendage of the housing. The width of the groove allows minor adjustments to be made in the longitudinal location of the lockout pin to allow for manufacturing tolerances and to insure proper valve position. A padlock is inserted through a hole in a lockout wheel fixedly connected to the lockout pin and through a hole in the lockout tab. When the padlock is locked the lockout pin is prevented from being withdrawn from the housing.

In an alternative embodiment, the spindle blocking means includes at least one lockout pin disposed in a lockout pin bore in the housing. The housing also has a pull pin bore therethrough. When the lockout pin is inserted through the lockout pin bore the lockout pin blocks rotation of the module spindle by engaging a recess in the spindle. A pull pin is then inserted through the housing and a pull pin bore in the lockout pin to prevent the lockout pin from being withdrawn. The end of the pull pin has a bore therethrough such that a padlock may be locked therein to prevent the pull pin from being withdrawn from the housing and the lockout pin.

In the alternative embodiment, the housing lockout pin bore is threaded as is the lockout pin so that the lockout pin may be screwed into the housing. In this embodiment, each spindle recess comprises a chamfered flat. The chamfers in conjunction with the threaded lockout pin facilitate minor adjustment to allow for manufacturing tolerances. Each lockout pin has two pull pin cross-bores therethrough to allow 90° incremental adjustment of the lockout pin. Thus the threaded lockout pin can be adjusted a longitudinal distance equal to one-fourth the thread pitch, and locked in each position.

Or, in the alternative embodiment, each spindle recess comprises a bore in the spindle. Unthreaded lockout pins are selectively slid in or out to engage and disengage the spindle bores in the open and closed position.

One advantage of the present invention is that an existing valve and actuator assembly may be field retrofitted with a lockout capability.

Another advantage of the present invention is that a mounting kit which has no lockout means does not have to be scrapped and substituted with a mounting kit which does have lockout means. Instead, the lockout module described herein is used as a functional interface between the existing actuator-to-valve mounting kit and the actuator.

Yet another advantage of the present invention is that a lockout device can be produced at a high volume thereby lowering the cost of the lockout device. The lockout module is more universal and not limited or specific to a particular valve configuration.

These and other objects and advantages of the present invention will become more readily apparent from the following detailed description of the invention taken in conjunction with the drawings herein, in which.

Figure 1:
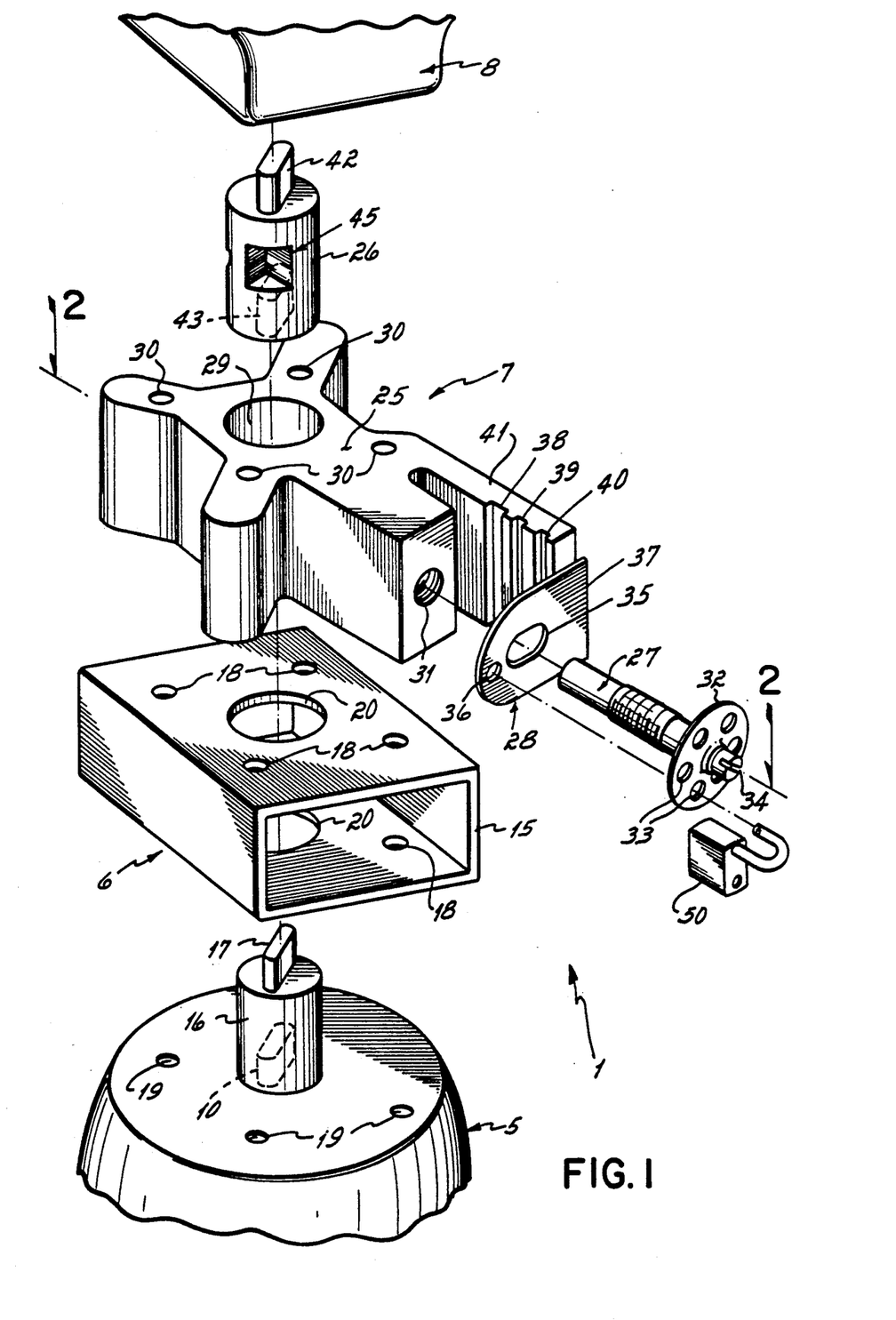
FIG. 1 is an exploded view of the preferred embodiment of the present invention.

With reference to FIG. 1, a valve lockout assembly 1 comprises, in combination, a valve 5, an actuator-to-valve mounting kit 6, a novel lockout module 7, and an actuator 8.

Valve 5 may be one of any number of standard, conventional valves, for example, and has a rotatable valve stem 10 (dotted lines) extending upwardly from an upper end thereof for actuating valve 5 between a closed position and an open position where stem 10 would be rotated clockwise 90°. Valve 5 is operable to control fluid flow in a fluid circuit (not shown).

An actuator-to-valve mounting kit 6 comprises a housing 15 within which resides a spindle 16 (shown in exploded form in FIG. 1 for clarity). This spindle 16 includes a lower end which is keyed with a slot (not shown) for receiving the valve stem 10 of the valve 5. The spindle further includes an upper end which has a flat sided stem 17 thereon adapted to be driven by actuator 8. The actuator-to-valve mounting kit housing 15 is adapted to be mounted to the valve 5 as by way of bolt holes 18 which are cooperable with similar holes 19 in the upper surface of the valve 5 and which may be secured together by way of, for example, threaded fasteners. Thus the lower side of kit 6 is configured to interface with valve 5. As described, spindle 16 resides within bore 20 in actuator-to-valve housing 15.

With reference to FIGS. 1-4, and describing now the preferred embodiment of the present invention, the lockout module 7 comprises a lockout module housing 25, a spindle 26, a lockout pin 27 and a lockout tab 28. The lockout housing 25 includes a bore 29 for receiving the spindle 26. The housing 25 further includes a plurality of bolt holes 30 which preferably mate with the bolt holes 18 of the actuator-to-valve mounting kit housing 15 and bolt holes (not shown) of the actuator 8. Thus the lockout module 7 is only adapted to interface with kit 6 and not directly with the valve 5. Accordingly, it is not necessary to provide numerous different modules 7. A threaded lockout pin bore 31 passes through the lockout housing 25 and intersects the lockout housing spindle bore 29. The lockout pin 27 is partially threaded for longitudinal adjustment within the bore 31.

The lockout pin 27 has fixedly secured thereto a lockout wheel 32 which has a plurality of circumferential holes 33 therein. The pin 27 further includes a slotted end 34 for adjustment with, for example, a flat blade screwdriver.

The lockout tab 28 has an elongated hole or slot 35 therein for accommodating the lockout pin 27. Additionally, the tab 28 includes a hole 36 which is alignable with one of the holes 33 in the lockout wheel 32. The tab 28 further includes a straight edge 37, which is cooperable with three grooves 38, 39 and 40 in an appendage or arm 41 of the housing 25.

Describing more particularly now the spindle 26 of this embodiment, the spindle 26 has an upper end which includes a flat sided stem 42 which is received into a drive aperture (not shown) within a rotatable drive component of actuator 8. The lower end of the spindle 26 has a similar aperture or opening 43 (dotted lines, FIG. 1) for receiving the stem 17 of the actuator-to-valve mounting kit in spindle 16.

Figure 2:
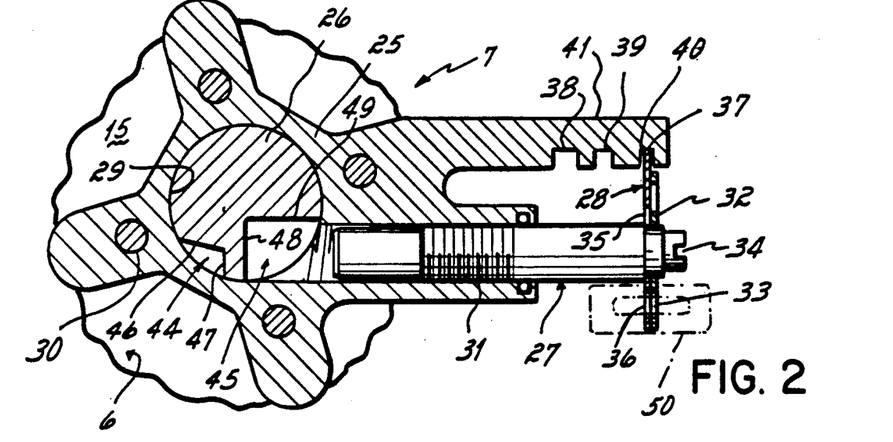
FIG. 2 is a partial cross-sectional view of the lockout module shown in FIG. 1, but in assembled form and taken along lines 2—2 of FIG. 1.
Figure 3:
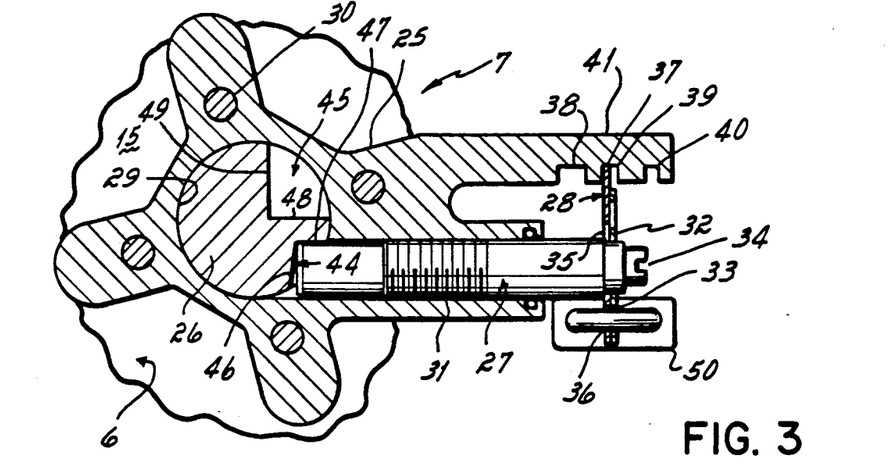
FIG. 3 is a view similar to FIG. 2 illustrating the lockout module spindle locked in one position.
Figure 4:
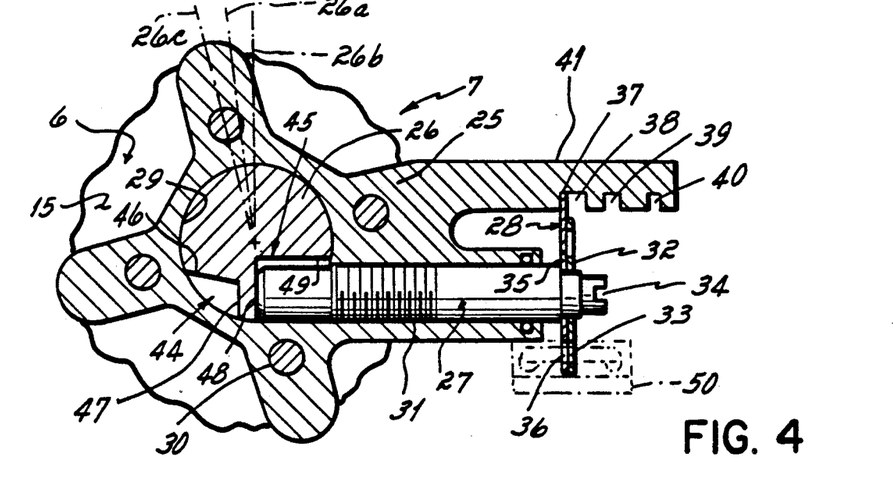
FIG. 4 is a view similar to FIG. 3 illustrating the lockout module spindle locked in another position.

With reference to FIGS. 2-4, it will be more clearly seen that the spindle 26 includes a pair of recesses 44 and 45 which may be engaged by the lockout pin 27 rendering the spindle 26 non-rotatable. Recess 44 includes a bottom or flat 46 and a sidewall 47. Similarly, recess 45 includes a bottom or flat 48 and a sidewall 49.

Describing now the operation of this preferred embodiment of the present invention, and referring now to FIG. 2, to allow the actuator 8 and hence the valve 5 to be freely movable between open and closed positions the lockout pin 27 is threaded out of the housing 25 until the pin 27 clears the spindle 26. The lockout tab 28 is then dropped into the groove 40. In this position, one of the holes 33 in the wheel 32 is aligned with the hole 36 in the tab 28, and the padlock 50 is inserted through these holes and locked. With the lockout pin 27 locked in this position, the actuator 8 may freely move the valve 5 between its opened and closed positions. Since the tab edge 37 is adjacent the bottom of the groove 40, and cannot be lifted out of groove 40, the lockout pin 27 is fixedly secured.

Referring now to FIG. 3, to lock the spindle 26 and hence the valve 5 in the open position, the actuator 8 is moved to the open position, which rotates the spindle 26 and opens the valve 5. In this position, the recess 44 of the spindle 26 is in a position to be engaged by the lockout pin 27. The padlock 50 is removed from the wheel 32 and tab 28. By virtue of the slot 35 therein, the tab 28 is moved out of the groove 40 in the arm or appendage 41 of the housing 25 to allow the pin 27 to be turned. Pin 27 is then threaded into the bore 31 until contacting the bottom or flat 46 of the recess 44, and the tab 28 is moved into the groove 39 in the arm or appendage 41 of the housing 25. As the tab 28 is now adjacent to the wheel 32, the lock 50 may now be inserted through one of the holes 33 in the wheel 32 and the hole 36 in the tab 28, and locked. The pin 27, bearing against the edge 47 of recess 44 effectively locks the spindle 26 and hence the valve 5 in the open position. To the extent that the width of the groove 39 exceeds the thickness of the tab 28, the lockout pin 27 may be adjusted, when unlocked into or out of the bore 31 as needed to completely effect an open position of the spindle 26.

Referring now to FIG. 4, the module 7 is shown with the spindle 26 and hence the valve 5 locked in the fully closed position. To lock the spindle 26 in the closed position, the padlock 50 is first removed from the wheel 32 and tab 28. Next the lockout pin 27 is threaded out of the bore 31 until the pin 27 clears the spindle 26. The actuator 8 is then rotated clockwise to the fully closed position, at which time the lockout pin 27 is threaded back into the bore 31 until engaging the bottom or flat 48 of the recess 45. The tab 28 is then dropped into the groove 38 and the lock 50 is secured through one of the holes 33 of the wheel 32 and the hole 36 of the tab 28, and locked. Minor adjustment of the spindle 26 to allow the valve 5 to be fully closed is facilitated to the extent that the width of the groove 38 exceeds the thickness of the tab 28 permitting longitudinal adjustment of pin 27 when unlocked.

In FIG. 4, the lockout adjustment range of spindle 26, and hence valve 5, is shown by center lines 26b and 26c, which it will be appreciated are about 12° apart. Dashed line 26a illustrates the design close position of the valve 5, and hence, the unadjusted locked close position of spindle 26. Due to possible misalignment from the mounting kit 6, the valve 5 may be completed closed at any position between lines 26b and 26c. The width of groove 38 allows longitudinal adjustment of pin 27 enabling the spindle 26 and hence valve 5 to be locked in any position between lines 26b and 26c. This ensures that the valve 5 can be locked in a completely closed position despite any misalignment from the mounting kit 6. It will be observed that a maximum rotational adjustment of the pin 27 of 60° will align a hole 33 of the lockout wheel 32 with the hole 36 in the lockout tab 28. This rotational adjustment will effect a longitudinal motion of the lockout pin 27 equal to 1/6 the pitch of the threads on the lockout pin 27. This provides a sufficiently accurate lockout pin position for preventing a significant opening motion of the spindle 26 and hence the valve 5 when the lockout pin 27 is engaged. The module of this embodiment provides up to a 12° tolerance, as evidenced by lines 26b and 26c. Other tolerances such as by wider grooves are operable.

Figure 5:
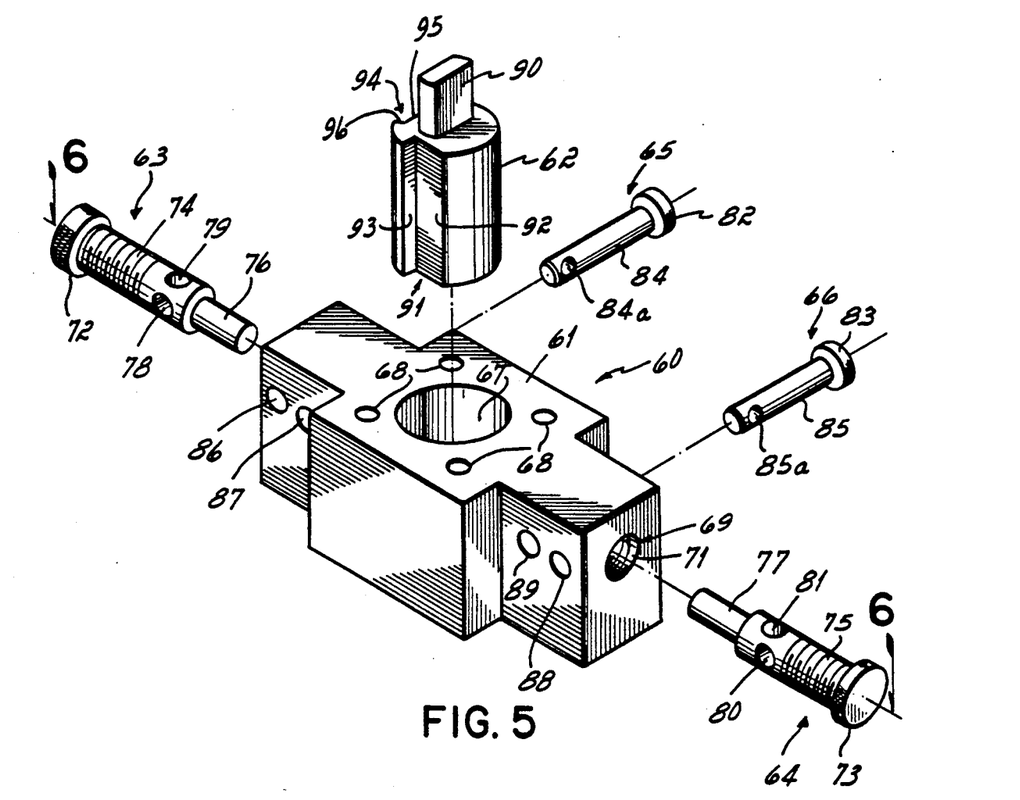
FIG. 5 is an exploded view of a first alternative embodiment of the present invention.

Referring now to FIG. 5, there is illustrated an alternative embodiment of the present invention. The lockout module 60 of this alternative embodiment comprises a lockout module housing 61, a spindle 62, a pair of lockout pins 63 and 64, and a pair of pull pins 65 and 66. The lockout housing 60 includes a bore 67 for receiving spindle 62. The housing 60 further includes a plurality of bolt holes 68 which preferably mate with the bolt holes 18 of the actuator-to-valve mounting kit housing 15 and the bolt holes of the actuator 8.

Figure 6:
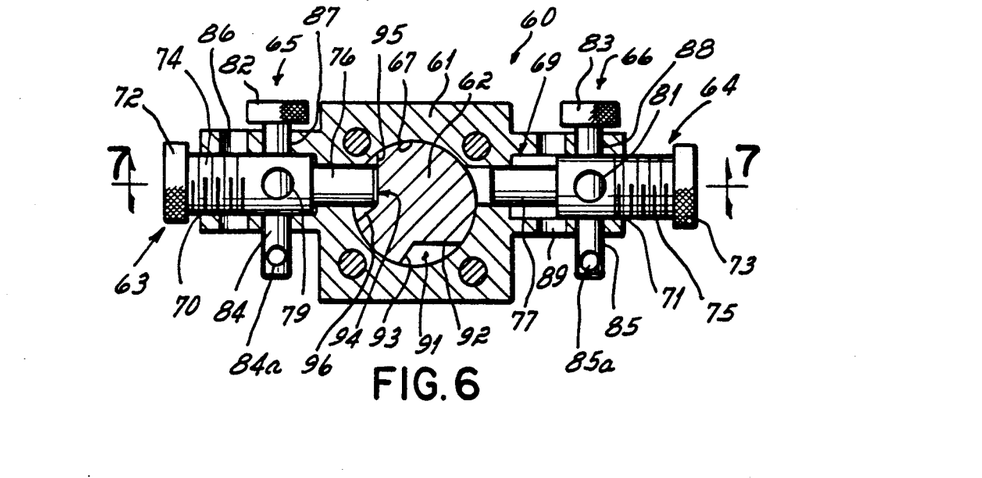
FIG. 6 is a partial cross-sectional view of the lockout module shown in FIG. 5, but in assembled form and taken along lines 6—6 of FIG. 5.
Figure 7:
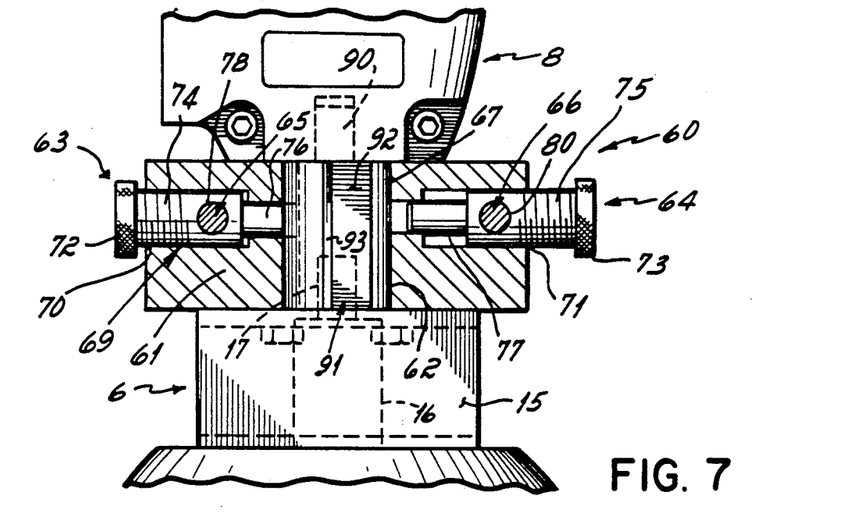
FIG. 7 is a cross-sectional view of the lockout module of FIG. 5, taken along lines 7—7 of FIG. 6.

With reference to FIGS. 5-7, it will be noted that a partially threaded and stepped down lockout pin bore 69 passes through the length of the lockout housing 61 and intersects the lockout housing spindle bore 67. Lockout pins 63 and 64 are also threaded for respective longitudinal adjustment within respective threaded ends 70 and 71 of bore 69.

The lockout pins 63 and 64 include knurled knobs 72 and 73, threaded bolt portions 74 and 75, and turned-down pin portions 76 and 77, respectively. The lockout pins 63 and 64 further include a pair of perpendicularly intersecting cross bores 78 and 79, 80 and 81, respectively, for receiving pull pins 65 and 66, respectively. These cross bores are substantially perpendicular to the centerline axes of the lockout pins 63 and 64.

Pull pins 65 and 66 have knurled knobs 82 and 83 and pin portions 84 and 85, respectively. Each pull pin is disposed in one hole of a pair of holes 86, 87 and 88, 89 in the housing 61 A hole pair is located on each end of the lockout housing 61 on opposite sides of the spindle bore 67. Bores 86 and 88 locate the lockout pins 63 and 64 in a disengaged position with respect to the spindle 62. Conversely, pull pin bores 87 and 89 locate the lockout pins 63 and 64 in fixed engagement with the spindle 62. The pull pins 65 and 66 have bores 84a and 85a through ends thereof, respectively, such that any suitable lock, such as a padlock, may be locked therethrough subsequent to the pins 65 and 66 being inserted through the housing pull pin bores, and the lockout pin pull pin bores. Thus, each lockout pin 63 and 64 may be positively secured in either an engaged relation with respect to the spindle 62 or a disengaged relation with respect to the spindle 62.

Describing more particularly now the spindle 62 of this embodiment, the spindle 62 has an upper end which includes a flat-sided stem 90 which is received into a drive aperture (not shown) within a rotatable drive component of actuator 8. The lower end of the spindle 26 has a similar aperture or opening (not shown) for receiving the stem 17 of the actuator-to-valve mounting kit spindle 16.

With reference to FIGS. 6-7, it will more clearly be seen that the spindle 62 includes a pair of recesses, each having a bottom or flat and an adjacent inclined sidewall or chamfer, which are engagable by the pin portions 76 and 77 of the lockout pins 63 and 64, respectively. The recess 91 is defined by a bottom or flat 92 and an inclined sidewall or chamfer 93. The flat 92 is substantially parallel to the longitudinal centerline axis of the spindle 62. Sidewall or chamfer 93 is at an angle slightly greater than 90° with respect to the flat 92. The recess 94 similarly includes a flat 95 and a chamfer 96 in a like relationship one to another. The recesses 91 and 94 are in a spaced relationship one to another of approximately 90° about a longitudinal centerline axis of the spindle 62.

Describing now the operation of this embodiment of the present invention, and referring to FIGS. 5-7, when the actuator 8 and hence the valve 5 is rotated completely clockwise thereby being in a fully closed position (FIG. 6), the lockout pin 63 is threaded into the end 70 of the lockout pin bore 69 until the forward tip of the pin portion 76 engages the flat 95 of the recess 94. It will be appreciated that the chamfer 96 of the recess 94 facilitates minor adjustment of the lockout pin 63 to compensate for manufacturing tolerances to which the valve 5, actuator-to-valve mounting kit 6, lockout module 60 and actuator 8 are manufactured.

As previously mentioned, manufacturing tolerances dictate that a particular valve 5 may not always be fully closed or fully opened at exactly 0° or 90°. Thus, the adjustable lockout pin 63 as hereinabove described may be turned more or less, as needed, to further advance or slightly retract the pin 63 so that it abuts the spindle 62. To accommodate any clockwise overtravel of the valve 5 in the closed position (FIG. 6), lockout pin 63 need merely be turned and hence slightly advanced toward flat 95; chamfer 96 will allow such clockwise overtravel. And, to accommodate any clockwise undertravel of the valve 5 in the closed position (FIG. 6), lockout pin 63 again need merely be turned and retracted slightly away from flat 95 to allow such undertravel.

It will also be appreciated that the lockout pin 63 must be rotated at least 90° to effect incremental longitudinal adjustment of the lockout pin 63 within the lockout pin bore 69. This is because one of the lockout pin pull pin bores 78 or 79 must be aligned with the housing pull pin bore 87 such that the pull pin 65 may be inserted completely therethrough. It will be observed that a 90° rotational adjustment of the lockout pin 63 will effect a longitudinal motion of the lockout pin 63 equal to ¼ the pitch of the threads on the lockout pin 63. This provides a sufficiently accurate lockout pin position for preventing counterclockwise motion of the spindle 62 when the lockout pin 63 is engaged.

To use the present invention to lock an actuator and hence a valve in a fully open position, the pull pin 65 is first withdrawn from pull pin bore 87 in the housing 61 and hence, from lockout pin 63. Next, the lockout pin 63 is turned counterclockwise in order to align one of the pull pin bores 78, 79 with the housing pull pin bore 86. When this alignment is obtained, the pull pin 65 is advanced through the pull pin bore 86 in the housing 61 and through the lockout pin 63. This effectively locks the lockout pin 63 in a disengaged or retracted relationship with respect to the spindle 62.

Next, the actuator 8 is rotated counterclockwise 90° to the fully opened position, which effectively rotates the valve 5 to a fully opened position. The other pull pin 66 is withdrawn from the housing, and the other lockout pin 64 is threaded into the end 71 of the bore 69 and until contact is made with the flat 92 or chamfer 93 of the recess 91, depending on manufacturing tolerances. Fine adjustment is effected by rotating the lockout pin in 90° increments. When either of the lockout pin pull pin bores 80, 81 are aligned with the housing pull pin bore 89, the pull pin 66 is inserted therethrough which locks the lockout pin into fixed engagement with the spindle 62 and thereby blocks it from rotating. With the pull pins in these respective positions, padlocks (not shown) may be locked through the padlock bores 84a, 85a in the ends of the pull pins 65, 66 to secure the spindle 62 and the valve 5 against movement.

Figure 8:
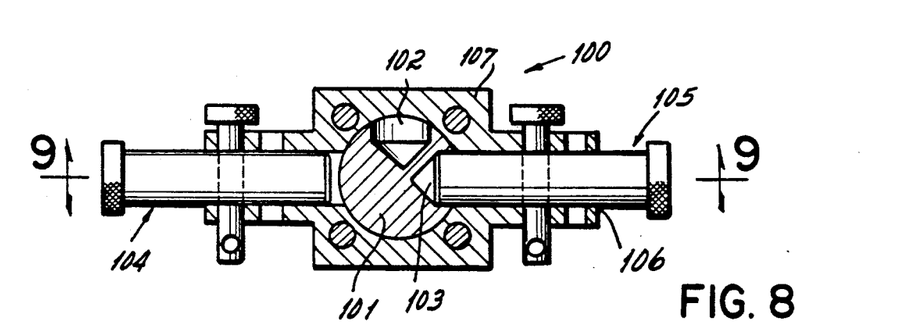
FIG. 8 is a view similar to FIG. 6 illustrating a second alternative embodiment of the present invention.
Figure 9:
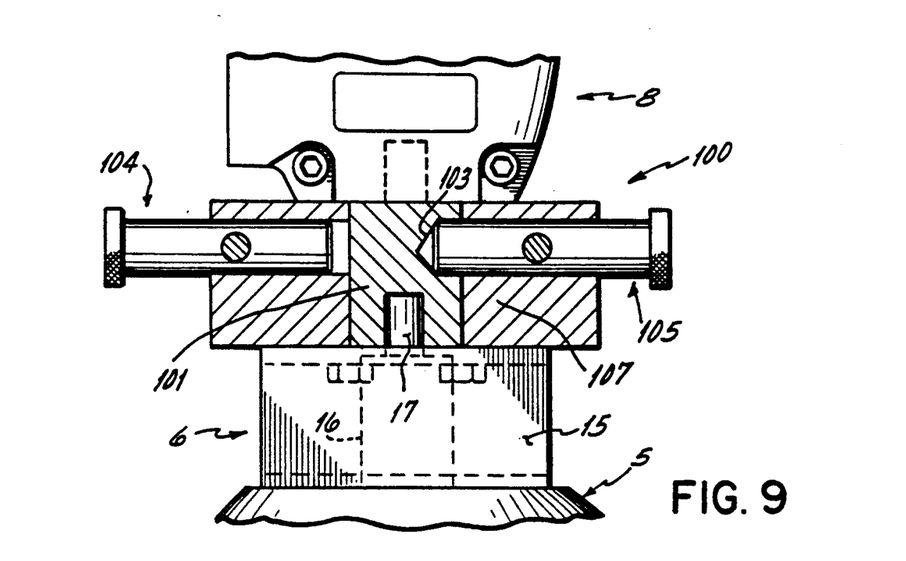
FIG. 9 is a cross-sectional view of the lockout module of FIG. 8, similar in view to FIG. 7, taken along lines 9—9 of FIG. 8.

Describing now another embodiment of the present invention, and referring to FIGS. 8-9, a spindle 101 of a lockout module 100 includes a pair of bores 102 and 103, which are selectively engaged by lockout pins 104 and 105, respectively. These modified lockout pins 104, 105 include no threaded portion; furthermore the lockout pin bore 106 within the lockout housing 107 is likewise unthreaded. In other respects, this embodiment is identical to the alternative embodiment (FIGS. 5-7), with like numbers designating like components.

The alternative embodiment of the present invention works much the same way as the primary embodiment, with the exception that the modified lockout pins 104, 105 simply slide into and out of the lockout pin bore 106 in the lockout housing 107. These pins 104, 105 cooperate with the orthogonal bores 102 and 103 in the spindle 101, for similarly locking the spindle 101 in either a fully opened or fully closed position.

Those skilled in the art will readily recognize adaptations and modifications which can be made to the present invention yet without departing from the spirit or scope of the invention; accordingly, applicant intends to be limited only by the following claims.

What is claimed is:

1. A valve actuator and lockout system of the type including an actuator for operating a valve and a mounting kit for mounting said actuator to one of a plurality of different valves, the improvement comprising:

a lockout means structurally independent of said mounting kit but operably interconnected between said actuator and said mounting kit for selectively transferring valve operating force from said actuator to said valve and for locking said valve against operation.

2. Valve lockout apparatus comprising in combination:

a valve means for controlling fluid flow and having at least two operating positions, a valve actuator means for actuating said valve between said positions, an actuator-to-valve mounting kit, and a lockout module means;

said actuator-to-valve mounting kit being adapted for operable mounting on said valve;

said lockout module means being structurally independent of said mounting kit and operably mounted between said actuator-to-valve mounting kit and said actuator to selectively lock said valve in one of said positions, and to accommodate valve operation by said actuator when said lockout module does not lock said valve.

3. The apparatus of claim 2 wherein said mounting kit has a spindle for operating said valve and wherein said lockout module comprises:

a housing, a spindle, and spindle blocking means;

said lockout module being in said housing and having one end adapted to be connected to said mounting kit spindle and another end adapted to be connected to said actuator such that operation of said actuator turns said module spindle and said mounting kit spindle to operate said valve, said spindle blocking means being operable to selectively block said module spindle and hence said valve in one of said positions.

4. Valve lockout apparatus comprising in combination:

a valve means for controlling fluid flow and having at least two operating positions, a valve actuator means for actuating said valve between said positions, an actuator-to-valve mounting kit, and a lockout module means;

said actuator-to-valve mounting kit being adapted for operable mounting on said valve, said lockout module means being operably mounted between said actuator-to-valve mounting kit and said actuator and being operable to selectively lock said valve in one of said positions, and to accommodate valve operation by said actuator when said lockout module does not lock said valve, said lockout module means comprising:

a housing, a spindle disposed in said housing, a lockout pin, and a lockout tab means, said housing having a lockout pin bore therethrough for receiving said lockout pin disposed therein, said spindle having one end adapted to be connected to said actuator-to-valve mounting kit and another end adapted to be connected to said actuator, said spindle further including recess means for receiving said lockout pin to block rotation of said spindle, said lockout tab means being engagable with said lockout pin and said housing, wherein when said lockout pin is advanced through said lockout pin bore in said housing, said lockout pin blocks rotation of said spindle, and wherein said lockout tab means is selectively operable to block removal of said lockout pin from said housing.

5. The apparatus of claim 4 wherein said lockout pin is threaded and said housing is mateably threaded.

6. The apparatus of claim 5 wherein said spindle recess means includes a pair of recesses, said recesses being spaced approximately 90° apart about said spindle.

7. The apparatus of claim 6 wherein said lockout pin includes a lockout wheel fixedly secured thereto, said wheel having a plurality of circumferential holes therein, said lockout tab means having a hole therein, said housing having at least one groove in an appendage thereof, said lockout tab means being engagable with said groove, wherein when one of said lockout wheel holes is aligned with said lockout tab means hole a lock may be secured therethrough rendering said lockout pin non-rotatable.

8. The apparatus of claim 7 wherein at least one of said grooves has a predetermined width for accommodating a plurality of longitudinal lockout pin positions and respective locked spindle positions.

9. Valve lockout apparatus comprising in combination:
a valve means for controlling fluid flow and having at least two operating positions,
a valve actuator means for actuating said valve means between said positions,
an actuator-to-valve mounting kit, and
a lockout module means;
said actuator-to-valve mounting kit being adapted for operable mounting on said valve,
said lockout module means being operably mounted between said actuator-to-valve mounting kit and said actuator and being operable to selectively lock said valve in one of said positions, and to accommodate valve operation by said actuator when said lockout module does not lock said valve,
said valve means having a predetermined closed position and said lockout module means including means for accommodating closed position variations in said valve means.

10. The apparatus of claim 2 wherein said lockout module comprises:
a housing,
a spindle disposed in said housing,
at least one lockout pin, and
at least one pull pin;
said housing having at least one lockout pin bore therethrough for receiving said lockout pin disposed therein, and at least one pull pin bore therethrough for receiving said pull pin disposed therein,
said spindle having one end adapted to be connected to said actuator-to-valve mounting kit and another end adapted to be connected to said actuator, said spindle further including recess means for receiving at least one lockout pin to block rotation of said spindle,
each said lockout pin having at least one pull pin bore therethrough for receiving a pull pin disposed therein,
wherein said lockout pin is advanced through said lockout pin bore in said housing, said lockout pin blocks rotation of said spindle, and wherein said pull pin is advanced through said housing pull pin bore and said lockout pin pull pin bore, said pull pin blocks removal of said lockout pin from said housing.

11. The apparatus of claim 10 wherein said lockout pin is threaded and said housing lockout pin bore is mateably threaded.

12. The apparatus of claim 11 wherein said spindle recess means comprises a pair of chamfered flats on said spindle, said chamfered flats being spaced approximately 90° apart about said spindle and being oriented generally parallel to said spindle.

13. The apparatus of claim 12 wherein said lockout pin has two intersecting pull pin bores therethrough, each said lockout pin pull pin bore being generally perpendicular to said lockout pin, said pull pin bores being spaced approximately 90° about said lockout pin.

14. The apparatus of claim 10 wherein said spindle recess means comprises a pair of bores in said spindle, said bores being spaced approximately 90° apart about said spindle and being generally perpendicular to said spindle.

15. An independent lockout module adapted to be operably mounted between an actuator-to-valve mounting kit having a spindle and a valve actuator and being operable in use to selectively lock a valve in at least two positions, said module comprising:
a housing,
an independent spindle, and
spindle blocking means;
said independent spindle being disposed in said housing and having one end adapted to be connected to a separate spindle of said actuator-to-valve mounting kit and another end adapted to be connected to said actuator such that operation of said actuator turns said independent spindle and said separate mounting kit spindle to operate said valve, said spindle blocking means being operable to selectively block said independent spindle and hence said valve in one of said two positions.

16. A lockout module adapted to be mounted between an actuator-to-valve mounting kit and a valve actuator and being operable in use to selectively lock a valve in at least two positions, said module comprising:
a housing,
a spindle disposed in said housing,
a lockout pin, and
a lockout tab means;
said housing having a lockout pin bore therethrough for receiving said lockout pin disposed therein,
said spindle having one end adapted to be connected to said actuator-to-valve mounting kit and another end adapted to be connected to said actuator, said spindle further including recess means for receiving said lockout pin to block rotation of said spindle,
said lockout tab means being engagable with said lockout pin and said housing, wherein when said lockout pin is advanced through said lockout pin bore in said housing, said lockout pin blocks rotation of said spindle, and wherein said lockout tab means is selectively operable to block removal of said lockout pin from said housing.

17. The apparatus of claim 16 wherein said lockout pin is threaded and said housing is mateably threaded.

18. The apparatus of claim 17 wherein said spindle recess means includes a pair of recesses, said recesses being spaced approximately 90° apart about said spindle.

19. The apparatus of claim 18 wherein said lockout pin includes a lockout wheel fixedly secured thereto, said wheel having a plurality of circumferential holes therein, said lockout tab having a hole therein, said housing having at least one groove in an appendage thereof, said lockout tab being engagable with said groove, wherein when one of said lockout wheel holes is aligned with said lockout tab hole a lock may be secured therethrough rendering said lockout pin non-rotatable.

20. The apparatus of claim 19 wherein at least one of said grooves has a predetermined width for accommodating a plurality of longitudinal lockout pin positions and respective locked spindle positions.

21. A lockout module adapted to be mounted between an actuator-to-valve mounting kit and a valve actuator and being operable in use to selectively lock a valve in at least two positions, said module comprising:
    a housing,
    a spindle disposed in said housing,
    at least one lockout pin, and
    at least one pull pin;
    said housing having at least one lockout pin bore therethrough for receiving said lockout pin disposed therein, and at least one pull pin bore therethrough for receiving said pull pin disposed therein,
    said spindle having one end adapted to be connected to said actuator-to-valve mounting kit and another end adapted to be connected to said actuator, said spindle further including recess means for receiving at least one lockout pin to block rotation of said spindle,
    each said lockout pin having at least one pull pin bore therethrough for receiving a pull pin disposed therein,
    wherein said lockout pin is advanced through said lockout pin bore in said housing, said lockout pin blocks rotation of said spindle and wherein said pull pin is advanced through said housing pull pin bore and said lockout pin pull pin bore, said pull pin blocks removal of said lockout pin from said housing.

22. The apparatus of claim 21 wherein said lockout pin is threaded and said housing lockout pin bore is mateably threaded.

23. The apparatus of claim 22 wherein said spindle recess means comprises a pair of chamfered flats on said spindle, said chamfered flats being spaced approximately 90° apart about said spindle and being oriented generally parallel to said spindle.

24. The apparatus of claim 23 wherein said lockout pin has two intersecting pull pin bores therethrough, each said lockout pin pull pin bore being generally perpendicular to said lockout pin, said pull pin bores being spaced approximately 90° about said lockout pin.

25. The apparatus of claim 21 wherein said spindle recess means comprises a pair of bores in said spindle, said bores being spaced approximately 90° apart about said spindle and being generally perpendicular to said spindle.

* * * * *

UNITED STATES PATENT AND TRADEMARK OFFICE
CERTIFICATE OF CORRECTION

PATENT NO. : 5,116,018
DATED : May 26, 1992
INVENTOR(S) : Friemoth et al.

It is certified that error appears in the above-indentified patent and that said Letters Patent is hereby corrected as shown below:

Col. 8, line 39, after "module" insert -- spindle --.

Col. 8, line 39, after "being" insert -- disposed --.

Signed and Sealed this

First Day of November, 1994

*Attest:*

BRUCE LEHMAN

*Attesting Officer*     *Commissioner of Patents and Trademarks*